(12) United States Patent
Timmermans et al.

(10) Patent No.: US 7,648,190 B2
(45) Date of Patent: Jan. 19, 2010

(54) BUS WITH IMPROVED CONSTRUCTIONS

(75) Inventors: Jos Timmermans, Ortonville, MI (US); Jean Raymond, Quebec (CA); Norman C. Haustein, Naples, FL (US)

(73) Assignee: Altair Engineering, Inc., Troy, MI (US)

( * ) Notice: Subject to any disclaimer, the term of this patent is extended or adjusted under 35 U.S.C. 154(b) by 0 days.

(21) Appl. No.: 11/947,893

(22) Filed: Nov. 30, 2007

(65) Prior Publication Data

US 2008/0116714 A1 May 22, 2008

Related U.S. Application Data

(63) Continuation-in-part of application No. 11/595,124, filed on Nov. 9, 2006.

(60) Provisional application No. 60/735,030, filed on Nov. 9, 2005.

(51) Int. Cl.
*B60N 3/00* (2006.01)

(52) U.S. Cl. .................... 296/178; 296/210; 40/593

(58) Field of Classification Search ............... 296/178, 296/179, 185.1, 210; 40/370, 593
See application file for complete search history.

(56) References Cited

U.S. PATENT DOCUMENTS

| | | | |
|---|---|---|---|
| 2,239,089 A | 4/1941 | Fageol | |
| 2,645,521 A * | 7/1953 | Judson | .................. 296/185.1 |
| 3,186,755 A | 6/1965 | Ward | |
| 3,881,765 A | 5/1975 | Cerra et al. | |
| 4,033,033 A | 7/1977 | Heffner | |
| 4,203,623 A | 5/1980 | Fenner et al. | |
| 4,254,987 A | 3/1981 | Leonardis | |
| 4,358,914 A | 11/1982 | Geyer | |
| 4,469,369 A | 9/1984 | Belik et al. | |
| 4,773,701 A | 9/1988 | Messori | |
| 5,131,714 A | 7/1992 | Evans, Sr. et al. | |
| 5,188,195 A | 2/1993 | Haustein | |
| 5,577,793 A | 11/1996 | Kobasic | |
| 5,934,739 A | 8/1999 | Waldeck | |
| 6,007,123 A | 12/1999 | Schwartz et al. | |
| 6,183,034 B1 | 2/2001 | Moody et al. | |
| 6,602,141 B2 | 8/2003 | Timmermans et al. | |
| 7,305,766 B1 | 12/2007 | Timmermans | |
| 2005/0000126 A1* | 1/2005 | Gray et al. | ................. 40/452 |

FOREIGN PATENT DOCUMENTS

NL    8602834    6/1988

OTHER PUBLICATIONS

Paul Dvorak, FEA and optimization leads to a more efficient design process, Oct 11, 2001, Machine Design, pp. 55-56.

* cited by examiner

*Primary Examiner*—Lori L Lyjak
(74) *Attorney, Agent, or Firm*—Young Basile (57) ABSTRACT

A vehicular bus having a roof reinforcement structure having a plurality of hubs and angularly spaced reinforcement channel members extending radially outward from each hub. The vehicular bus further includes and improved destination sign and advertising panel members positioned in the interior of the bus and extending down the sides of a bus visible through the side windows.

18 Claims, 7 Drawing Sheets

FIG. 16

BUS WITH IMPROVED CONSTRUCTIONS

This continuation-in-part application claims priority of Utility patent application Ser. No. 11/595,124 filed Nov. 9, 2006 which claims priority to Provisional Application No. 60/735,030 filed on Nov. 9, 2005, the contents of both applications are hereby incorporated by reference in their entirety.

BACKGROUND

This invention relates to buses and more particularly to several improved constructions for buses.

A typical bus provides an elongate skeletal construction forming a front end with the windshield for viewing the road, two sidewalls, and a rear end for housing the engine. At an upper corner of the windshield in the front end is displayed a destination sign instructing oncoming passengers of the route number and final destination of the bus. During humid or frigid temperatures, the destination sign is subject to fog or frost which diminishes the visibility of the sign to waiting passengers.

Another feature of existing bus construction is that the sidewalls of the bus are parallel and the front access door has sliding panels that open in the line of site of the side rearview mirror. These panels obstruct the vision of the bus driver for viewing potential passengers leaving or approaching the bus from the rear direction. Further the combination of the door entry and the sidewall being perpendicular to the front of the bus makes entry of the bus by a handicapped person in a wheelchair, a walker, or a small motorized chair from entering the bus.

In another feature offered by the current bus construction is a planar wall formed by the sidewalls of the bus for use for advertising. Generally, the advertising is only attached on the space not occupied by windows. However, screen advertisement is now available which also covers the windows but allow for passengers to view the outside. The disadvantage of this advertising scheme is that the amount of advertising is limited and must be physically installed and later removed in order to apply another advertisement on the sidewall. Further the screened advertisement placed over the windows minimized the viewing pleasure of the passengers in the bus. Although viewing through the screened advertisement is possible, the view is distorted.

Prior bus roof constructions typically included a thin outer roof skin and many reinforcement structures generally positioned longitudinally down the length of the bus and perpendicularly across the width of the bus to provide the structural stiffness required. Since the outer roof skin was thin and provided little structural support, the longitudinal and lateral reinforcements had to be positioned relatively close to one another and required numerous separate pieces connected together. Where bus roof vents were required, additional reinforcements were needed to frame the opening and connect to the other adjacent reinforcements. The numerous interconnected reinforcements add cost in materials, manufacturing and assembly of the bus.

SUMMARY

It is the intent of this invention to address the aforementioned concerns.

In one aspect of the invention an improved designation sign is provided that is positioned and configured for maintaining the sign free from frost and moisture when the vehicle is in use.

In another aspect of the invention, an improved bus construction is provided that facilitates entry into the bus by wheelchair bound passengers and prevents visual obstruction for the driver when the front door is open. One means for accomplishing these advantages includes an inwardly tapered front side having the front door assembly disposed therein. The front door assembly includes a pair of panels that move between an open position and a closed position and are configured for moving out of a driver's line of vision to the side mirror when the pair of panels are in the opened position.

In yet another aspect of the invention an improvement to the bus construction includes an advertising presentation positioned along an upper portion of the sidewalls and visible through the panes of glass of the window assemblies when the window is in the closed position.

In another example of the invention, a bus roof support structure includes a multi-layer structural roof skin and roof reinforcement members angularly positioned with respect to one another and extending radially outward from one or more joints. The roof reinforcement members are connected to the roof panel.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENTS

Figure 1:
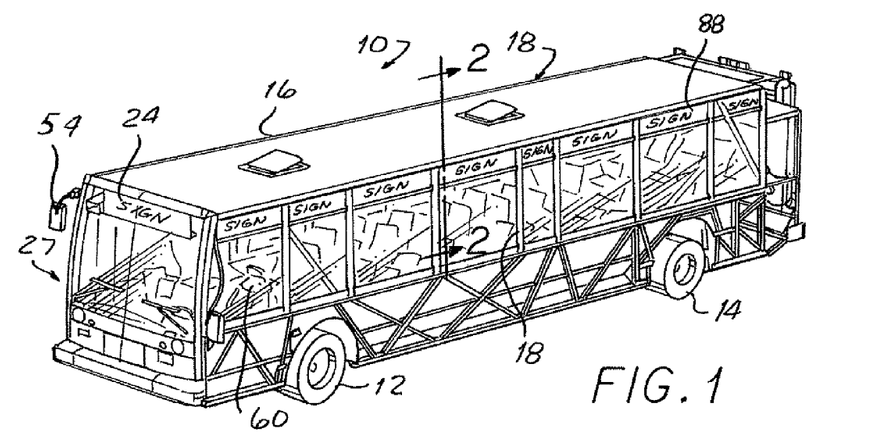
FIG. 1 is a perspective view of a bus according to the invention.

Referring to the FIGS. 1-16, the bus 10 as best seen in FIG. 1 includes, in known manner, front steer wheels 12, rear drive wheels 14, a main body structure 16, a roof and side window construction 18, and a front end 20, including a front door assembly 22 and a destination box 24.

Figure 1A:
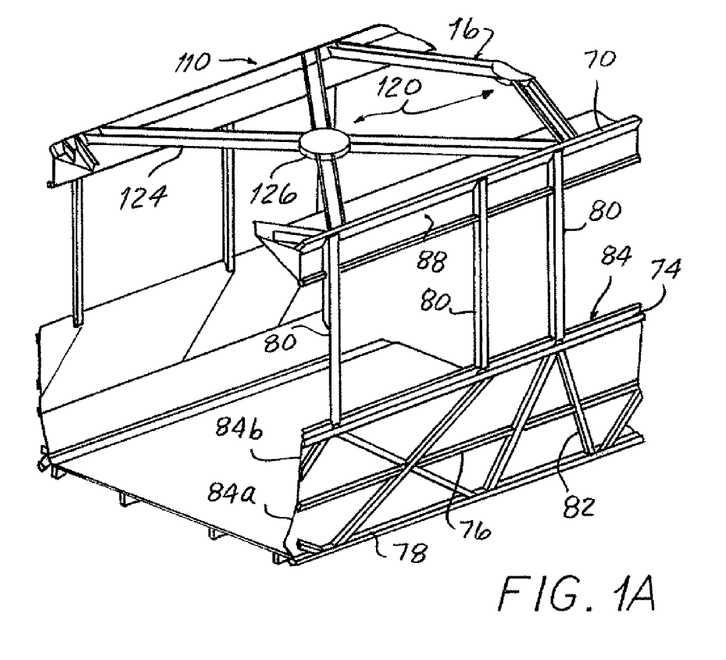
FIG. 1A is a fragmentary perspective view of the bus skeletal main body structure.

Main body structure 16 comprises a plurality of welded together metallic members and, specifically, includes a roof longitudinal tubular member 70, an upper longitudinal tubular member 72, a waist longitudinal tubular member 74, an angle longitudinal member 76, a lower longitudinal, tubular member 78, vertical tubular pillars 80, and a plurality of diagonal tubular truss members 82 arranged in crossed fashion.

Roof member 70 is arranged in a canted fashion and the upper ends 80a of pillars 80 are beveled and welded to a canted, lower side face 22a of the roof member. The lower ends 80b of the pillars are beveled and secured to the inboard face 74a of waist member 74 and a reinforcing gusset 83 is weldingly secured between the outboard face of each pillar and the upper face of the waist member 74.

Upper tubular member 72 is constituted by a plurality of tubular member sections 72a extending between respective adjacent pillars 80.

Truss members 82 extend in cross fashion between waist member 74 and lower member 78.

Main body structure 16 further includes an inner skin member 84 and an outer skin member 86.

Inner skin 84 has a planar, lower main body portion 84a and an upper portion 84b offset outboard with respect to lower portion 84a. Upper portion 84b includes an offset section 84c, a vertical section 84d, an upper horizontal section 84e, and a downturned lip section 84f.

Outer skin 86 includes a main body planar portion 86a and an offset upper edge portion 86b. Offset upper edge portion 86b includes an inwardly and upwardly angled section 86c terminating in a vertical lip section 86d. Angled section 86c is positioned against gussets 83 with lip section 86d extending upwardly in general alignment with inner skin lip section 84f.

The roof and side window construction 18 of the bus is best seen in FIG. 2-8.

Figure 6:
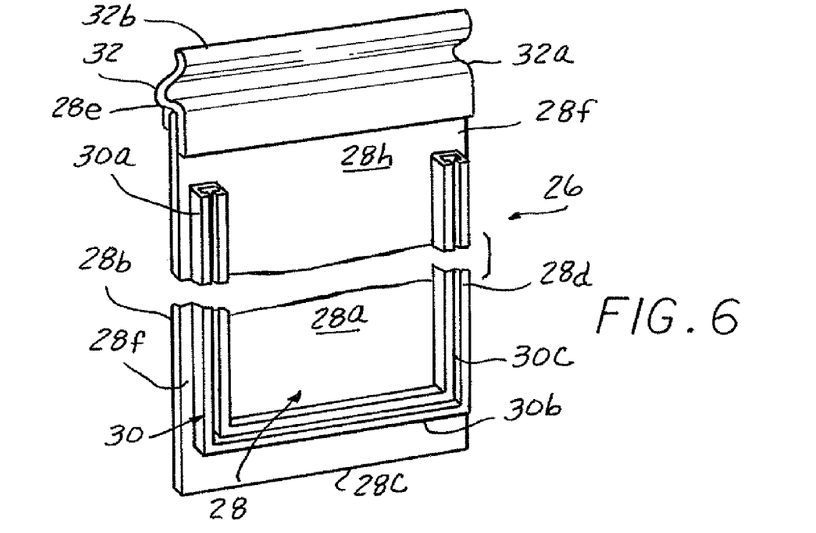
FIG. 6 is a perspective view of a side window assembly.

The roof and side window construction 18 includes a plurality of window assembles 26 arranged in side-by-side relation along each side of the vehicle and each including a glass pane 28, a frame 30, and a pivot member 32.

Each pane 28 has a curved configuration conforming to the desired cross-sectional configuration of the bus.

Each frame 30 has a U-shaped configuration and is adhesively secured to the inner face 28a of the pane with the individual frame sections 30a, 30b, and 30c inwardly spaced relative to the respect side edges 28b, 28c, and 28d of the pane and the top of the frame en masse spaced significantly downwardly down from the top edge 28e of the pane.

Each pivot member 32 includes a lower socket portion 32a fitted over the upper edge 28e of the respective pane and adhesively secured to the pane and an upper arcuate pivot portion 32b.

Figure 2:
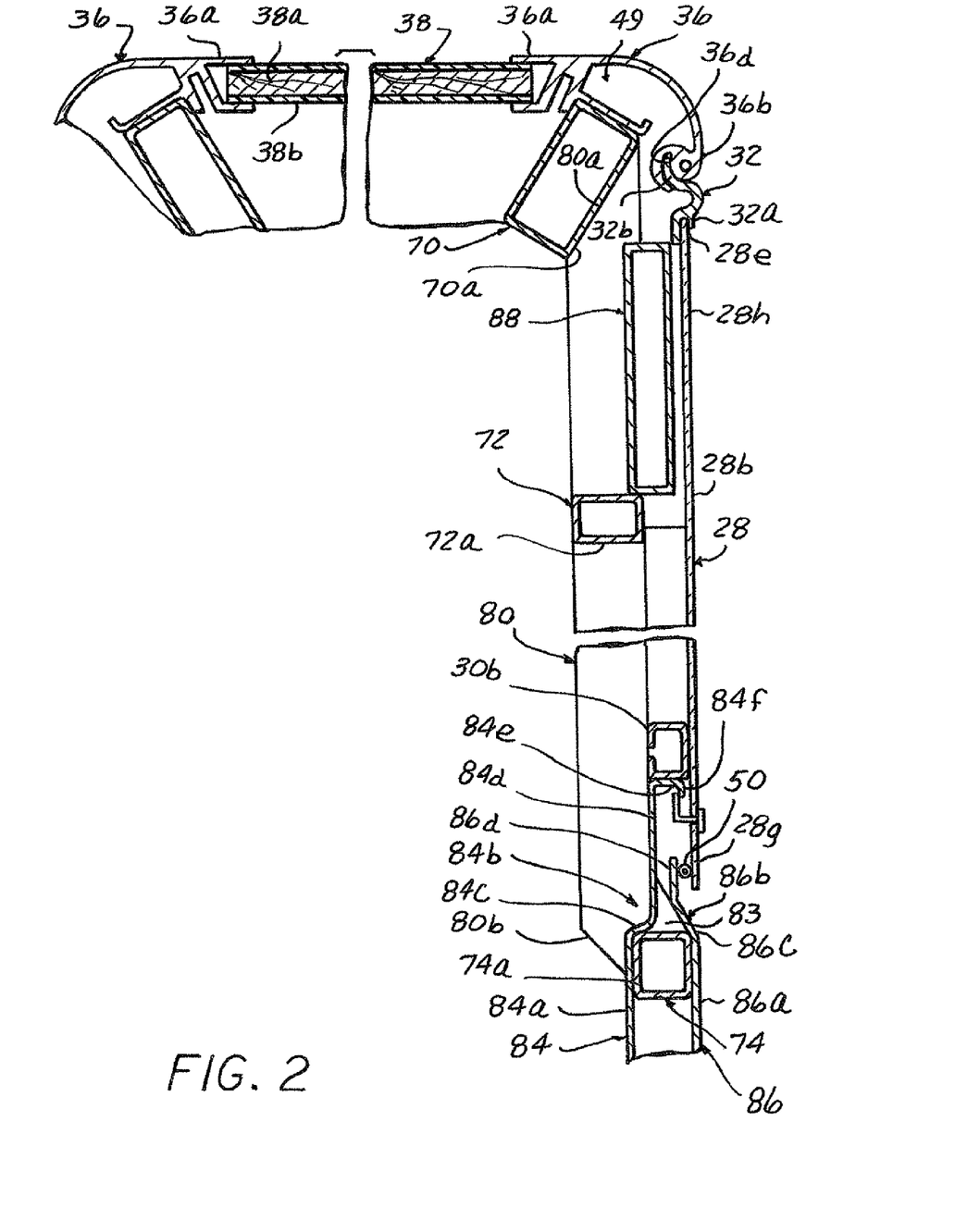
FIG. 2 is a cross sectional view taken along lines 2-2 in FIG. 1.
Figure 3:
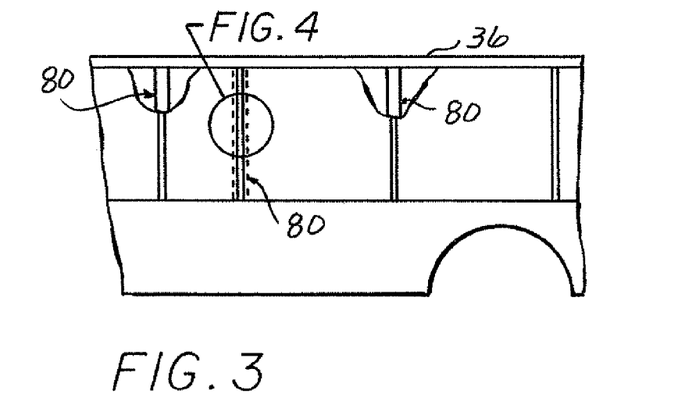
FIG. 3 is a fragmentary elevational view of a sidewall of the bus illustrating certain features.
Figure 4:
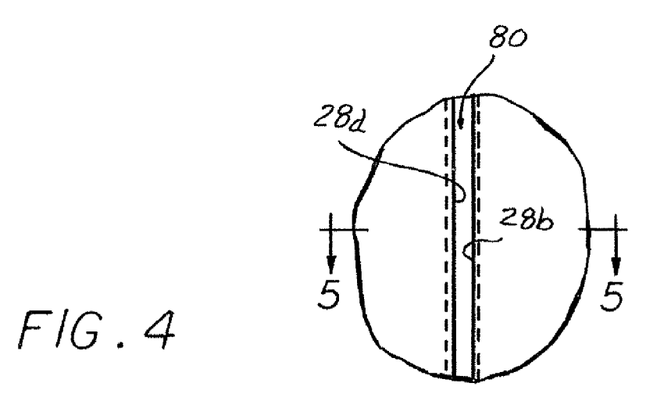
FIG. 4 is an enlarged view of the circled area in FIG. 3.
Figure 5:
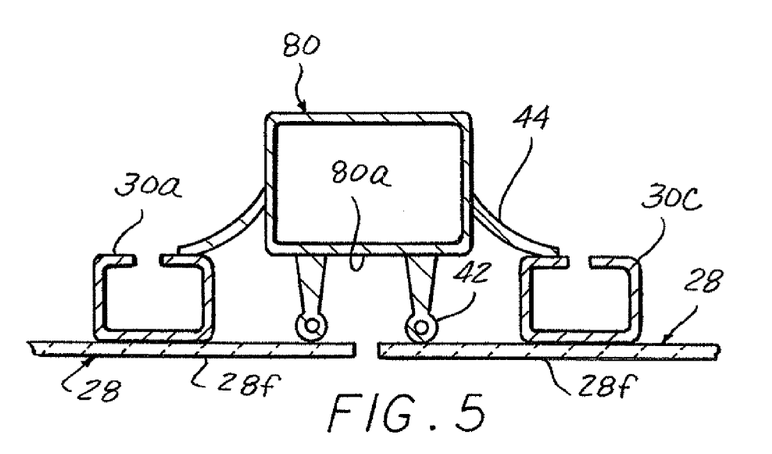
FIG. 5 is a cross-sectional view taken along line 5-5 in FIG. 4.

Successive pivot members 32 are pivotally received in an aluminum extrusion member 36 extending along each upper side of the bus. Each extrusion member 36 includes an upper socket portion 36a receiving a roof panel 38 forming the roof of the bus, a socket portion 36b pivotally receiving the pivot members 32, and an arcuate connector portion 36c. Roof panel 38 has a laminated construction including a central balsa wood core 38a and fiberglass upper and lower sheets 38b. Socket portion 36b defines an arcuate socket 36d receiving the pivot portion 32b of each pivot member 32, whereby the successive window assemblies are pivotally mounted along each side of the bus and may move selectively between lowered or closed positions and raised or open positions.

In their lowered position, a side edge 28b of the pane of one glass assembly is positioned immediately adjacent the side edge 28d of an adjacent window assembly with the lower frame member 30b nesting within an immediately above horizontal section 84e of inner skin 84, side frame members 30a and 30c of adjacent window assemblies positioned in flanking but somewhat outboard relation to respective pillars 80, and the side edge portions 28f of the panes 28 outboard of the respective frame members 30a/30c positioned proximate the outboard face 80a of the pillar with seals 42 (FIG. 5), carried either by the pillar or the panes, interposed therebetween. Further seals 44 are provided on each pillar 80 for sealing engagement with a respective frame member 30a/30c of a respective window assembly with the window assemblies in their closed positions.

With the window assemblies in their closed positions, the top of each window assembly frame 30 is positioned proximate a tubular section 72a and the lower edge portion 28g of each glass pane below the lower frame member 30b may rest against the upper edge 86d of outer skin 86 with a seal 50, carried either by the glass or by the skin, interposed between the glass and the skin. The glass assemblies may be moveable between their open and closed positions either manually or with the aid of strut assist devices (not shown). The described window construction also allows ready access to a compartment 49 over the windows within the extrusion member 36, allowing access to wire harnesses, compressed air plumbing, and other accessory components positioned within the extrusion member.

Figure 7:
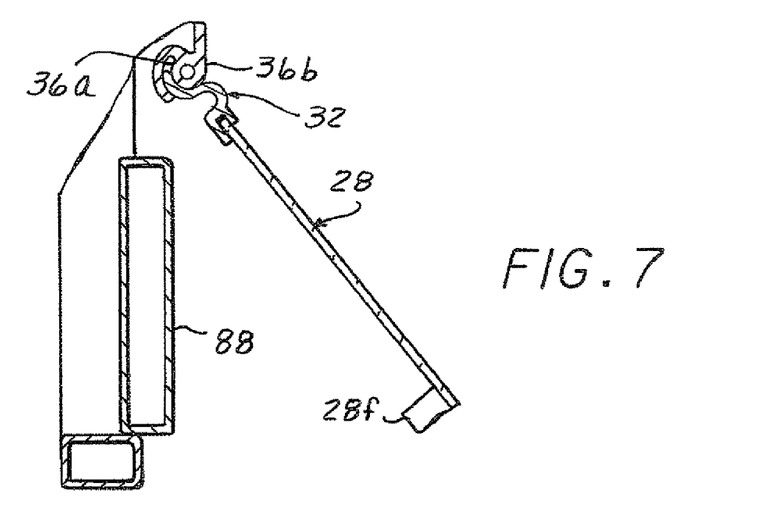
FIG. 7 is a side sectional view of the window assembly in the open position.

An improved advertising presentation for the bus is best seen in FIGS. 1, 2 and 7. The advertising presentation is provided by a plurality of panels 88 positioned between adjacent pillars 80 above, and mounted on, tubular section 72a. These panels are clearly visible through the upper portion 28h of each glass pane with the window assemblies in their closed positions. These panes 28, taken together, provide a convenient and readily-visible advertising space or media extending continuously along each side of the bus. This space, because of its height, is clearly visible above most traffic and the space, because of its continuous elongated nature, lends itself to sequential displays either aesthetic or animated, of various types of advertising media which may be incorporated along this space including but not limited to LEDS. This space can also be used for real-time information like news flashes, time until the next bus arrives, public interest messages, and security warnings (terrorist alerts, ozone warnings, etc.).

Figure 8:
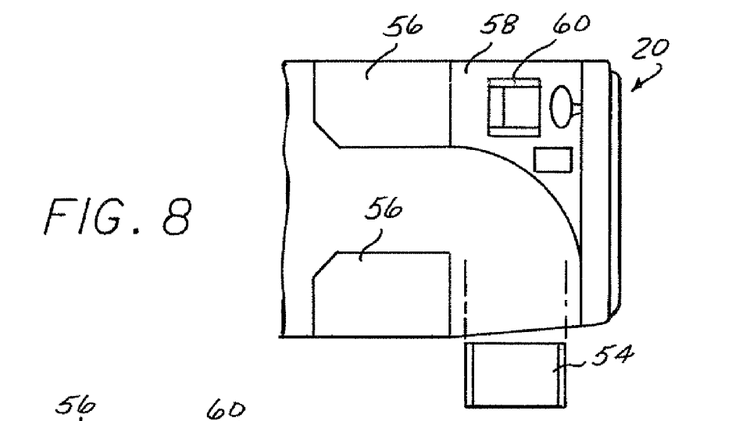
FIG. 8 is a schematic drawing to a pathway of the interior of the bus at the front door according to the prior art.
Figure 9:
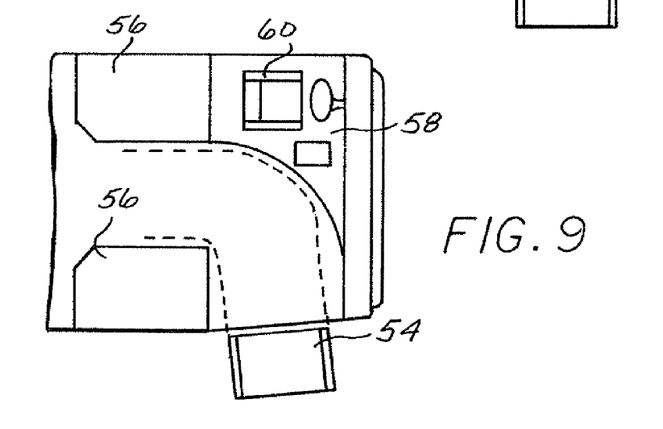
FIG. 9 is a schematic drawing to the pathway of the interior of the bus at the front door according to the present invention.
Figure 10:
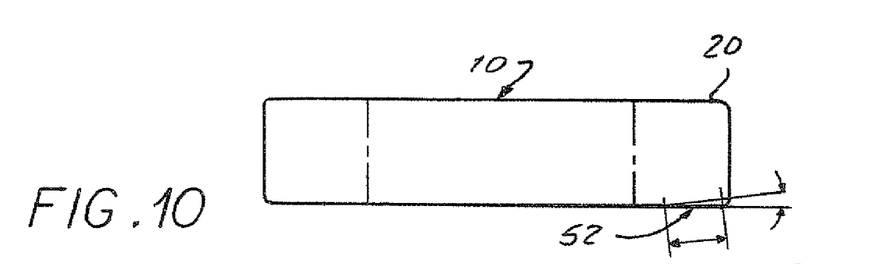
FIG. 10 is a schematic drawing illustrating a tapered front side wall on the bus.

The improved front end construction of the bus is best seen in FIGS. 9-13 and 15-16. As seen, the front of bus, rather than terminating in parallel sides intersecting a front end disposed at right angles with respect to the sides, includes a taper at the front end of the right side of the bus which has the result of cocking the front doorway 52 at an angle with respect to the sides of the bus and with respect to the centerline of the bus. This angle is useful in accommodating access to the interior of the bus by a handicapped person in a wheelchair 54. As best seen in FIG. 8, with a conventional entryway where the front door entrance is substantially parallel to the sides and centerline of the bus, it is virtually impossible for a wheelchair-bound person to enter the bus since the wheelchair will either engage and interfere with one of both of the wheel housings 56 and/or the raised platform 58 on which the driver's seat 60 is typically positioned. This difficulty is illustrated by the dash lines in FIG. 8, which illustrate the track that the wheels of the wheelchair would follow as an attempt is made to access the bus through the conventional front door opening. As shown, this track interferes with one or more of the wheel wells 56 and/or the driver's platform 58. This problem is solved by the construction of the invention wherein the front entry door is cocked with respect to the side edges of the bus so that, as seen in FIG. 9, the wheelchair 54 may gain ready access to the bus with the track of the wheels of the wheelchair moving readily into the interior of the bus and avoiding any contact with either the wheel housings 56 or the raised driver platform 58. This smooth access to the interior of the bus, as opposed to the difficult if not impossible access with the conventional front-door opening, is of course made possible by the fact that the wheelchair starts out already tilted significantly with respect to the side edges and the centerline of the bus so that the turning that the wheelchair must make to gain access to the center aisle of the bus is significantly less than the turning required with the conventional front door opening.

Figure 13:
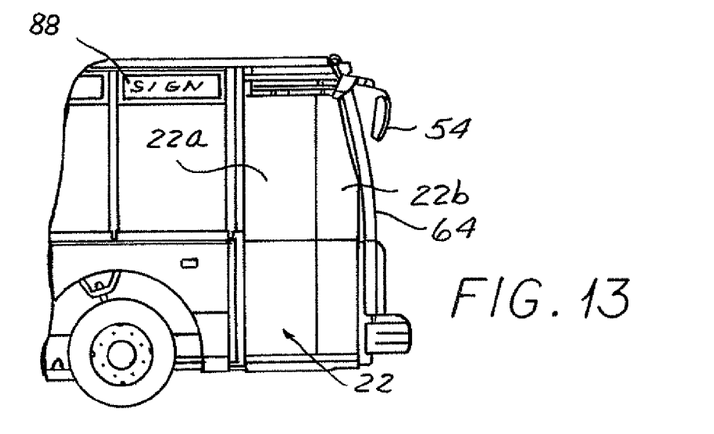
FIG. 13 is an elevational view of the front door according to the present invention.
Figure 15:
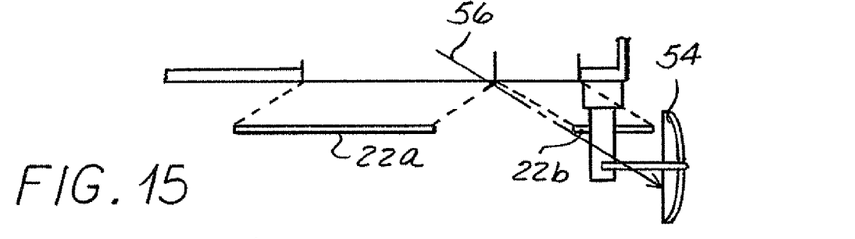
FIG. 15 is a schematic view of the front doors shown in FIG. 13 in the open position according to the present invention.

The improved front door construction of the invention is best seen in FIGS. 13 and 15. As seen, the front door 22 of the bus, rather than being, as is conventional, divided into two equal-sized panels, is instead divided into a rear relatively wide panel 22a and a front relatively narrow panel 22b. This has the effect of getting the front panel 22b out of the way of the driver's line of vision to the right outside rearview mirror 54 when the door panels are in their open position.

Figure 14:
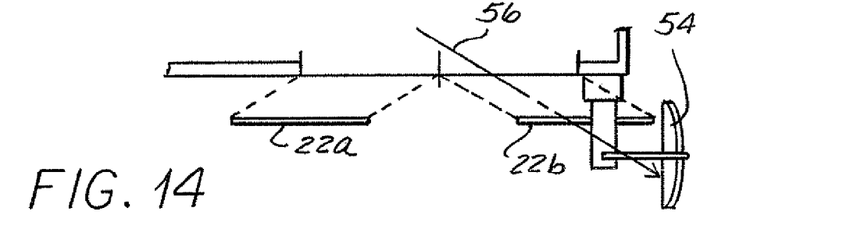
FIG. 14 is a schematic view of front doors in the open position according to the prior art.

Specifically, as seen in FIG. 14. illustrating a conventional front door wherein the front and rear door panels 22c and 22d, respectively, are of equal width, as the doors move in a generally parallelogram manner from their closed to their open positions, the front panel 22c assumes a position immediately in front of and blocking the line of vision 57 of the driver to the mirror 54 whereas, by comparison, with the arrangement of the invention, shown in FIG. 15, utilizing the relatively narrow front panel 22b, the front panel 22b can be arranged to move substantially out of the driver's line of vision 56 and substantially forwardly of the mirror 54 with the door in its open position. This is an important safety consideration since it is critical that the driver, using the right hand rearview mirror, be able to watch the rear door of the bus and the right rear drive wheel of the bus at each stop to ensure that no passengers are getting on or off the bus via the rear door before resuming forward motion of the bus and closing the front doors.

Figure 16:
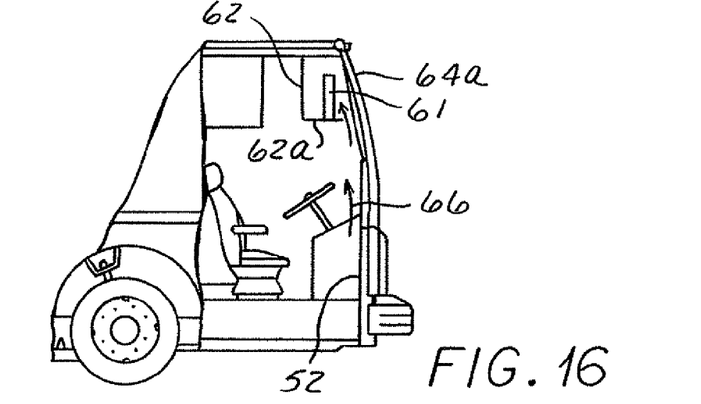
FIG. 16 is a fragmentary side view of the front of the bus illustration location of a destination box.

An improved destination sign box construction is best seen in FIGS. 1 and 16. As seen, the destination sign 61 is positioned in a free standing and open support box 62. Specifically, the lower wall 62a of the support box 62 is spaced back rearwardly from the windshield 64 of the bus to provide ready access to the destination sign from the front for service and cleaning, and, specifically, to allow conditioned air 66 from the existing heating and defrost system to enter into the support box 62 and keep the sign 60, as well as the upper portion 64a of the windshield, clear of frost and moisture. Orientation of the support box 62 relative to the windshield 64 allows a hand to enter the support box to clean the destination box without removing the sign from the support box 62 and removal or change of the destination sign 61 can be installed from the back.

Figure 11:
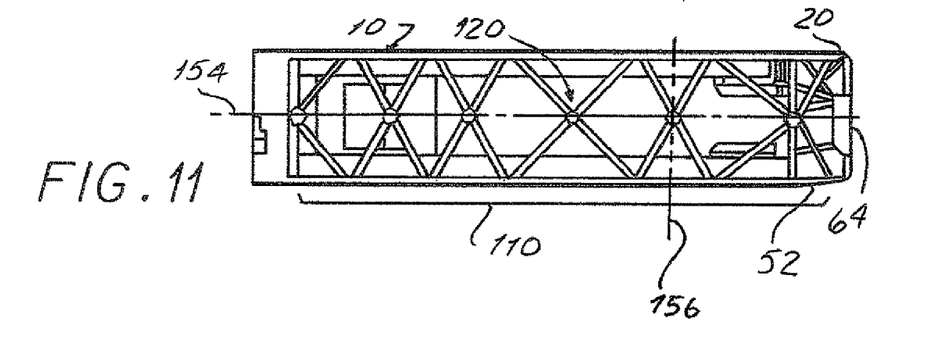
FIG. 11 is a top view of the skeletal main body structure.
Figure 12:
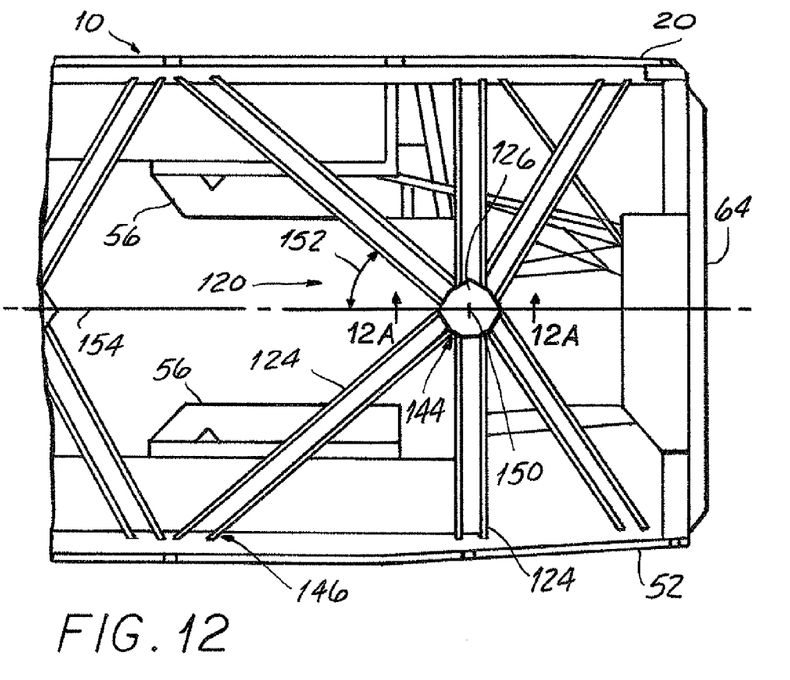
FIG. 12 is an enlarged view of the front section of the skeletal main body structure shown in FIG. 11.
Figure 12A:
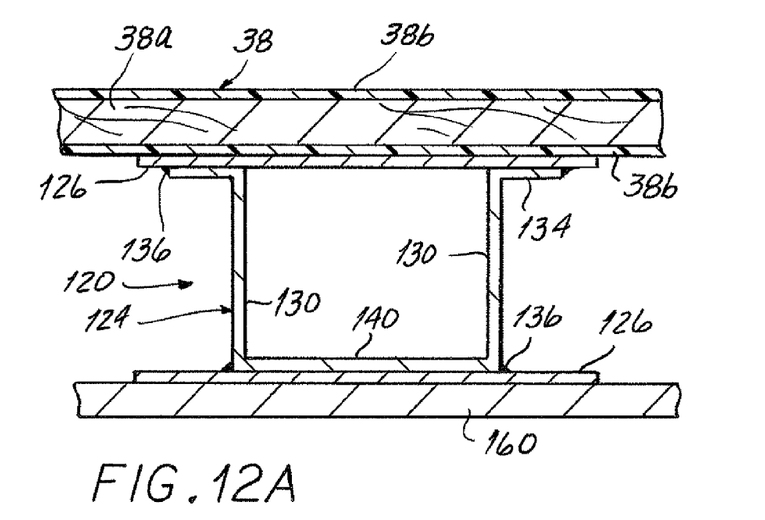
FIG. 12A is an enlarged cross sectional view taken along line 12A in FIG. 12.

Referring to FIGS. 1A, 11, 12 and 12A, a roof reinforcement structure 110 for bus 10 is illustrated. In an example as best seen in FIGS. 11, 12 and 12A, roof reinforcement structure 110 includes a plurality of hubs 120 generally aligned along a longitudinal axis 154. Each hub 120 includes at least two channel members 124 angularly positioned with respect to one another and extending radially outward from a joint 150 positioned substantially along longitudinal axis 154. Depending on the performance requirements, joints 150 may be reinforced with additional brackets or reinforcements (not shown). In a preferred example, hubs 120 further include a pair of connector plates 126, one plate 126 positioned on each side of the channel members as best seen in FIG. 12A. Channel members 124 include a first end 144 adjacent joint 150. The first ends 144 of adjacent members 124 are connected to one another, for example, by seam welding or other connecting methods, for example structural adhesive or mechanical fasteners, known by those skilled in the art. In a preferred method of structurally connecting first ends 124, one of the members 124 is provided as a continuous channel through connector plates 124 and the other adjacent members are connected thereto. Each channel member 124 further includes a second end 146 which is connected to an adjacent bus sidewall structural member, for example, roof members 70 as shown in FIG. 1A. Channel members 24 are preferably made from steel, but may be made from other materials, for example, aluminum or composite materials such as fiberglass.

As shown in FIG. 11, the number of channel members 124 and their angular spacing 152 from one another and from longitudinal axis 154 and lateral axis 156 may vary according to the structural requirements of the roof and to accommodate accessories, for example, roof vents as seen in FIG. 1. It is understood that the number and positional spacing of hubs 120 may similarly vary to meet the particular requirements.

In a preferred example, connector plates 126 are circular or multi-faceted in shape and are made from steel. It is understood that plates 126 can take other forms, for example, one or more rectangular, circular or polygonal-shaped pieces and may be made from other materials for example, aluminum or other composite materials.

Referring to FIG. 12A, in a preferred example, channel members 124 include a pair of channel walls 130 each ending in an outwardly extending flange 134. Walls 130 are joined at a bottom 140 forming a continuous structural channel. In the area of first ends 144, channel 124 is preferably positioned between a pair of connector plates 126. In a preferred example, channel flanges 134 and bottom 140 are seam welded 136 to the respective connector plates 126 for structural rigidity. It is understood that other methods of connection may be used for example resistance spot welding, structural adhesive or mechanical fasteners, In a preferred example, channel walls 130 are approximately 3 inches in height and bottom wall 140 is approximately 4 inches in width. Other sizes and shapes of channel members 124 may be used, for example, alternate open sections or closed, tubular sections known by those skilled in the art.

Hubs 120 are structurally connected to multi-layer roof panel 38 as best seen in FIGS. 2 and 12A. Hubs 120 may be secured to roof panel 38 through welding, adhesive or mechanical fasteners (not shown) suitable for the type of materials used for the hubs 120 and roof panel 38. Further, channel members 124 may further be connected to the roof panel 38 by similar methods known by those skilled in the art.

Unlike conventional roof panels, the exemplary multi-layer laminated roof panel 38 is itself preferably a structural member which provides rigidity, and in combination with roof reinforcement 110, provides for a more efficient roof reinforcement system. Roof panel 38 may be made from other materials than previously described for example, aluminum inner and outer skin 38*b* and a foam core 38*a* as best seen in FIG. 2. Other materials and laminated structures known by those skilled in the art may be used. In a preferred example, roof reinforcement 110 is concealed from occupant view by an interior roof trim panel 160 or headliner for aesthetic purposes. Additional insulation panels (not shown) may be positioned between the roof reinforcement 110 and the trim panel 160, or may be positioned between channel members and attached to the inner layer of roof panel 38*b*. The fewer number of structural channel members 124 provides an advantage over prior designs having many more reinforcement members which require an increased number of separate insulation pieces over the present invention.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A transportation vehicle roof structure for use in a vehicle having a longitudinal axis, the roof structure comprising:
   a roof reinforcement having at least two reinforcement hubs spaced from one another along the longitudinal axis, each of the two hubs having a joint and at least two channel members extending radially outward from the joint and are angularly spaced from one another with respect to the joint, at least one of the channel members further having an elongate upstanding wall and a flange positioned adjacent one of a vehicle roof panel and an inner roof trim panel for attachment of the channel to the one of a vehicle roof panel and inner roof trim panel.

2. A transportation vehicle roof structure for use in a vehicle having a longitudinal and a lateral axis, the roof structure comprising:
   a roof reinforcement having at least two reinforcement hubs spaced from one another along the longitudinal axis, each of the two hubs having a joint and at least two channel members extending radially outward from the joint and are angularly spaced from one another with respect to the joint, each of the channel members further comprises a pair of side walls each wall having a flange positioned adjacent a vehicle roof panel and wherein the walls are joined by a bottom connecting the two side walls.

3. The roof structure of claim 2 wherein each flange and the bottom are positioned approximately 90 degrees with respect to the side walls.

4. The roof structure of claim 2 wherein all of the channel members of at least one hub are positioned at angles away from the longitudinal axis and the lateral axis of the vehicle.

5. The roof structure of claim 2 wherein each of the hubs includes a connector plate connected to first ends of the channel members to provide stability and rigidity to the channel members.

6. The roof structure of claim 5 further comprising two connector plates, each plate positioned on opposing sides of the first ends of the channel members to reinforce the adjoining first ends.

7. The roof structure of claim 5 wherein the connector plates are positioned substantially along the longitudinal axis of the vehicle.

8. The roof structure of claim 5 further comprising a multi-layer roof panel substantially covering the roof of the vehicle, wherein the roof reinforcement is connected to roof panel.

9. The roof structure of claim 8 wherein the roof panel further comprises a first layer positioned on the exterior of the vehicle, a second layer mounted to the first layer, and a third layer positioned toward the interior of the vehicle and mounted to the second layer.

10. The roof structure of claim 9 wherein the first and third layers are fiberglass and the second layer is wood.

11. The roof structure of claim 2 wherein the vehicle is a bus.

12. A vehicular bus having a driver's area and a front windshield, the improvement comprising:
    a destination sign box for use in displaying a destination sign, the sign box comprising a support box positioned within the interior of the bus passenger compartment rearward of the windshield;
    a destination sign positioned in the support box facing the windshield, wherein the support box includes at least one open side permitting free circulation of conditioned air around the destination sign.

13. The vehicular bus of claim 12 wherein the destination sign is free standing in the support box.

14. The vehicular bus of claim 12 wherein the support box permits access to the sign from at least one side of the support box.

15. A vehicular bus having sidewalls positioned generally parallel to a longitudinal axis of the bus, vertical pillars positioned along the sidewalls, and a plurality of transparent side windows positioned on upper portions of the sidewalls between the vertical pillars; the improvement comprising:
    a plurality of successive panels positioned in an interior of the bus adjacent upper portions of the side windows along at least one sidewall of the bus, wherein advertising media is displayed on the panels visible from the exterior of the bus.

16. The vehicular bus of claim 15, the improvement further comprising a pivot member connected to an upper portion of each side window and the side wall permitting rotational movement of the side window to an open and a closed position.

17. The vehicular roof structure of claim 1 wherein the at least one channel upstanding wall is substantially vertical.

18. The vehicular roof structure of claim 1 wherein the at least one channel upstanding wall comprises a pair of spaced upstanding sidewalls joined by a bottom connecting the two sidewalls forming a cavity therebetween.

* * * * *